United States Patent [19]

Murdough et al.

[11] 3,734,077
[45] May 22, 1973

[54] HEAT-RETAINING FOOD SERVER

[75] Inventors: Charles P. Murdough, Evanston; Alfred W. Neely, Northbrook, both of Ill.

[73] Assignee: American Hospital Supply Corporation, Evanston, Ill.

[22] Filed: Mar. 15, 1972

[21] Appl. No.: 234,945

[52] U.S. Cl. ................................. 126/246, 126/375
[51] Int. Cl. ............................................. A47g 23/04
[58] Field of Search ............................. 126/246, 375

[56] References Cited

UNITED STATES PATENTS

| | | | |
|---|---|---|---|
| 1,049,385 | 1/1913 | Mohrenwitz | 126/246 X |
| 3,065,744 | 11/1962 | Scauullo | 126/246 |
| 3,557,774 | 1/1971 | Kreis | 126/246 |

*Primary Examiner*—William F. O'Dea
*Assistant Examiner*—Peter D. Ferguson
*Attorney*—Dawson, Tilton, Fallon & Lungmus

[57] ABSTRACT

A hollow food serving dish having upper and lower metal shells with a heat-retaining pellet and a resilient cushioning element disposed therebetween. The shells are generally rectangular in shape, when viewed in elevation, and are hermetically sealed together only at their peripheral edges. Limited expansion is permitted upon heating, but the danger of bursting is avoided by reason of the configuration and construction of the dish.

10 Claims, 5 Drawing Figures

PATENTED MAY 22 1973 3,734,077
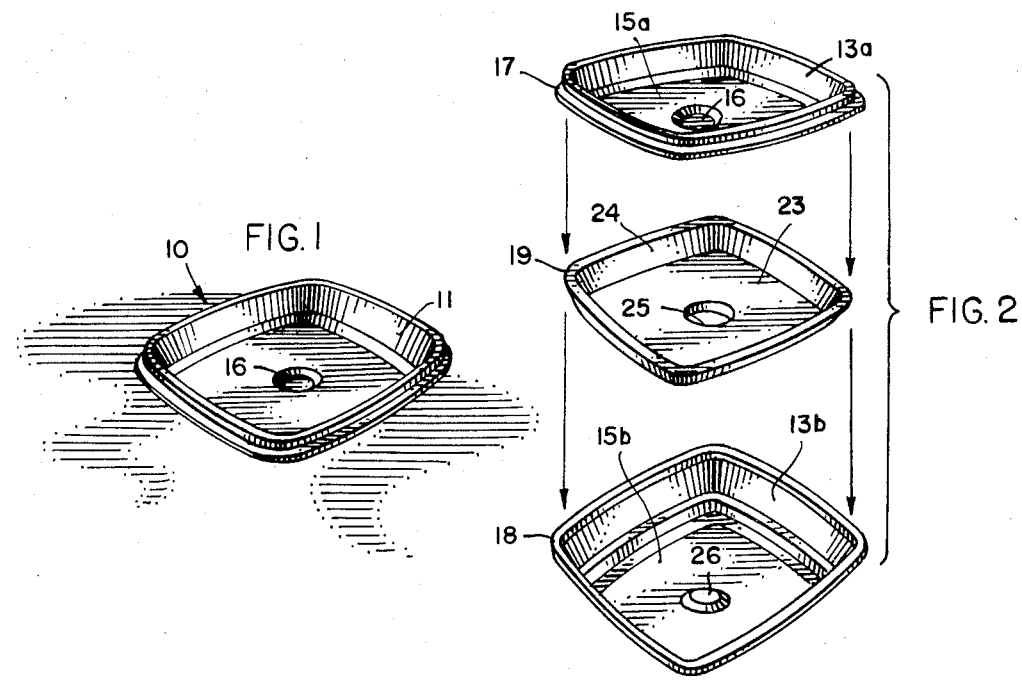
FIG. 1
FIG. 2
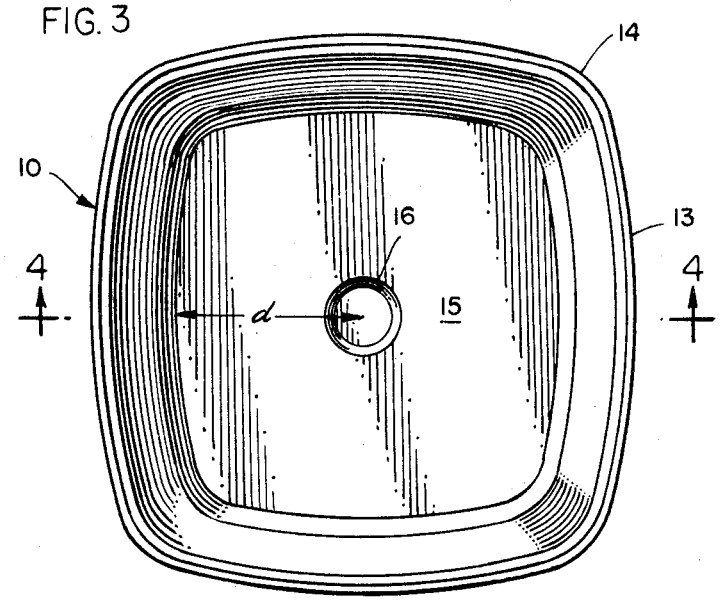
FIG. 3
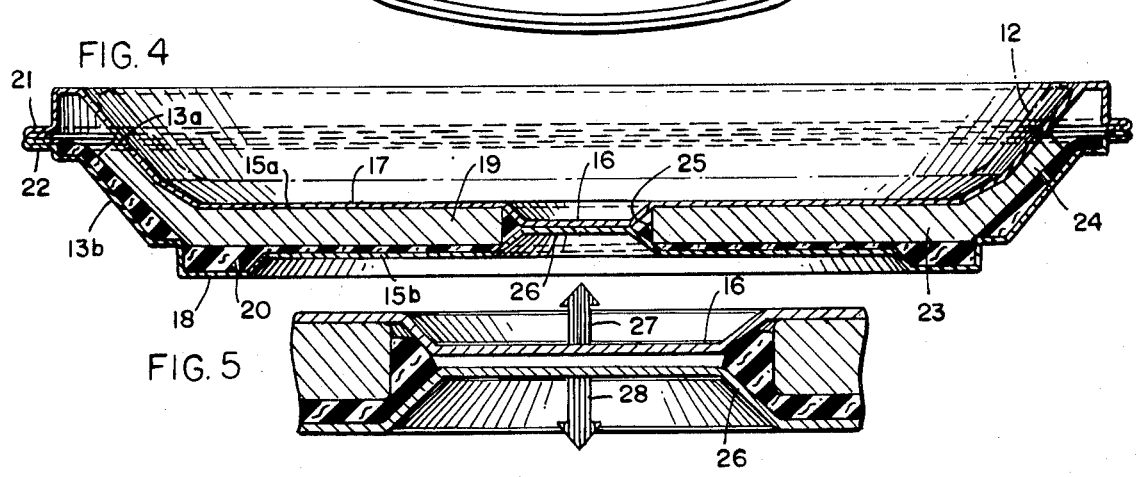
FIG. 4
FIG. 5

HEAT-RETAINING FOOD SERVER

BACKGROUND

U.S. Pat. No. 3,557,774 discloses a heat-storage dish or server of circular configuration which is composed essentially of an upper shell, a lower shell, and an annular heat-storage pellet locked therebetween. In the service of hot meals, such a dish is pre-heated to a suitable temperature so that when food is placed therein (normally such food is supported on a separate plate which is then received within the pre-heated dish), the heat retained by the dish will maintain the food at serving temperature for a substantial period of time. The problem, as brought out in the aforementioned patent, is that accidental overheating of such a server might cause permanent deformation of the shells and, even worse, a dangerous bursting apart of the server by reason of the build-up of air pressure therein. To prevent such bursting, the patent teaches that the central zones of the upper and lower circular shells must be welded together through the opening in the annular heat-retaining pellet.

Other patents of interest are co-owned U.S. Pat. Nos. 3,436,097, 2,656,946, 2,709,534, 2,767,100, and U.S. Pat. No. De. 191,124, as well as U.S. Pat. Nos. 2,830,576 and 2,582,735.

SUMMARY

One aspect of the present invention lies in the discovery that a serving dish of the general type described above, large enough for the entree service of an individual meal, may be constructed without central welding, and without danger of bursting upon heating to temperatures even substantially higher than the maximum temperatures encountered in commercial kitchens for the pre-heating of heat-storage dishes, if the upper and lower shells of the pellet-containing dish are generally rectangular rather than circular in shape. While it is believed important that the upper and lower shells be centrally indented, the opposing surfaces of the indented portions are not directly connected. Since the heat-storage pellet is supported upon a cushioning layer of resilient material, preferably a heat-insulating material such as fibrous glass matting, such layer is capable of expanding to maintain the heat pellet in contact with the undersurface of the upper shell even when the shells bow outwardly to a slight extent at elevated temperatures. The result is a non-bursting food server which achieves the advantages of prior constructions while at the same time is far simpler and less expensive to fabricate.

The server comprises a pair of upper and lower shells, each of generally rectangular shape, which are welded or otherwise securely and sealingly joined together about their edges. A generally rectangular heat-storage pellet is disposed between the shells and is supported upon a resilient pad of insulating material. The pellet is centrally apertured and a centrally depressed circular portion of the upper shell projects downwardly into that aperture. Similarly, a raised circular portion of the lower shell projects upwardly into the aperture of the pellet. While such portions are normally in contact, or in close proximity, they are not welded or otherwise joined together. Slight outward deformation of the upper and lower shells is therefore possible, such deformation being restrained by the formed central portions of the shells and by the rectangular configuration of each of the shells.

Other objects, advantages, and functions will become apparent as the specification proceeds.

DRAWINGS

FIG. 1 is a perspective view of a server embodying the present invention;

FIG. 2 is an exploded perspective view of the server;

FIG. 3 is a top plan view of the server;

FIG. 4 is an enlarged vertical sectional view taken along line 4—4 of FIG. 3;

FIG. 5 is a still further enlarged fragmentary sectional view illustrating in somewhat schematic fashion the relationship of the parts when internal pressure urges the upper and lower shells apart.

DESCRIPTION

In the drawings, the numeral 10 generally designates a server or dish which is recessed at 11 to receive a plate 12 (FIG. 4). The plate may be formed of china, glass, or any other suitable material, and forms no part of the present invention although such a plate would be commonly used in conjunction with the server. Similarly, a cover (not shown), formed of plastic or metal, would normally be fitted over the server to help retain heat and moisture as food is being transported from the kitchen to the place of food service.

It is to be noted that the dish 10 is generally rectangular (square) in configuration with slightly bowed sides 13 and rounded corners 14 (FIG. 3). The upper surface of bottom 15 is generally flat except for a circular central depression 16 which will be described in greater detail hereafter.

The dish is formed of four components: an upper shell 17, a lower or bottom shell 18, a heat pellet 19, and a resilient insulating pad 20. The rectangular upper and lower shells 17 and 18 are die formed from stainless steel or from any other material having similar properties of durability and strength. As shown most clearly in FIG. 4, the upper shell 17 has a generally flat bottom wall 15a and an upwardly and outwardly sloping side wall 13a. Similarly, bottom shell 18 has a bottom wall 15b and an upwardly and outwardly sloping side wall 13b. The side walls of the two shells are provided with outwardly projecting beads 21 and 22, respectively, which are joined together by welding or by any other suitable means so that the space between the imperforate upper and lower shells is hermetically sealed. It will be observed that the outline of bottom walls 15a and 15b conforms to the outline of the dish as a whole; specifically, walls 15a and 15b are generally rectangular (square) in shape.

Heat-retaining pellet 19 is formed of aluminum, or an aluminum alloy, or some other solid material, preferably metal, which has superior heat absorbing and retaining properties. The pellet is relatively thick and, in the illustration given, has a flat generally rectangular horizontal portion 23 and an upwardly and outwardly inclined peripheral flange portion 24. Preferably, the upper surface of the pellet conforms generally to the undersurface of walls 15a and 13a of the upper shell and, as shown in FIG. 4, such surfaces are in direct contact. Thus, heat retained by the pellet is transmitted directly to the walls of the upper shell which in turn transmit the heat to the food within the dish. The thickness of the pellet is less than the corresponding dimensions of the space between the upper and lower shells. The resilient pad 20, formed of non-woven glass fibers or any other suitable insulating and cushioning material, occupies the space between the undersurface of the pellet and the lower shell 18. Such pad not only performs an insulating function, tending to direct heat from the pellet upwardly rather than downwardly or outwardly, but also, because of its resilient character and its compressed condition, urges the pellet 19 upwardly into tight engagement with the upper shell.

A central aperture 25 is provided in the heat retention pellet or element 19. The aperture is circular in shape and, as shown in FIG. 4, the centrally depressed portion 16 of the upper shell is dimensioned to fit within that aperture. The lower shell 18 is provided with a central raised portion 26 which extends upwardly into the aperture and which directly opposes the depressed portion 16 of the upper shell. In the embodiment illustrated in the drawings, portions 16 and 26 are normally in contact with each other, or are at least closely spaced. It is to be noted, however, that such portions are not welded or otherwise secured to each other. Thus, when the dish is pre-heated, such portions are capable of moving apart to a slight extent, as indicated by arrows 27 and 28 in FIG. 5, in response to material expansion and the increased pressure of gas within the dish.

It has been found that a dish constructed as described above, and large enough to contain the main course of a complete individual meal service, is capable of withstanding extremely high temperatures, specifically, temperatures in excess of 1,000° F., without bursting. Such temperatures are far in excess of those to which such a dish would be exposed in normal usage, and even well above those that might occur through accidental overheating. The precise reasons for such resistence to rupture and permanent deformation may not be entirely understood, especially in view of the difficulties encountered in the prior art which have given rise to centrally welded dish constructions, but it is believed that a primary factor lies in the generally rectangular (square) configuration of the dish. It will also be observed that distance $d$, shown in FIG. 3, is less than the radius of a circular dish having a horizontal surface of the same area as surface 15a. Thus, even though the diagonal measurements of the square dish are greater than the diameter of a circular dish of the same capacity, the relatively short distance $d$, in comparison to the larger radius of a circular dish, may be particularly significant. Also, the variable "radius" of the square dish (i.e., the fact that distance $d$ is less than a corresponding diagonal measurement) appears to have a reinforcing or rigidifying effect. The result is a generally square unitized heat-retaining dish which is capable of withstanding relatively high temperatures without at the same time having its upper and lower shells centrally connected.

While it is apparent that the size of the dish may be varied somewhat, it has been found that a dish suitable for an individual service of a main dinner course should have a dimension $d$ between 2 to 3 inches. Thus, the transverse (non-diagonal) measurement of plate 12 would fall within the range of approximately 6 to 7 inches. A heat-retaining pellet having a thickness of its main body portion of approximately one-fourth of an inch has been found particularly effective although it is believed apparent that such dimension may be varied to a considerable extent.

While in the foregoing we have disclosed an embodiment of the invention in considerable detail for purposes of illustration, it will be understood by those skilled in the art that many of these details may be varied without departing from the spirit and scope of the invention.

We claim:

1. A food serving dish comprising a generally rectangular upper metal shell, a generally rectangular lower metal shell hermetically sealed to the upper shell only about the peripheral edges thereof, said upper and lower shells defining a space therebetween, a heat-retention pellet disposed within said space in direct contact with the undersurface of said upper shell, and a resilient heat-insulating cushion within said space between said pellet and said lower shell urging said pellet upwardly to maintain the same in direct contact with the undersurface of said upper shell throughout the range of temperatures to which said dish is normally subjected.

2. The structure of claim 1 in which said pellet is generally rectangular in shape.

3. The structure of claim 2 in which said pellet has a central aperture, said upper shell having a centrally depressed portion projecting downwardly into said aperture, and said lower shell having a centrally raised portion disposed within said aperture, said central portions of said upper and lower shells being disposed adjacent but unattached to each other.

4. The structure of claim 3 in which said central portions of said upper and lower shells are generally circular in configuration.

5. The structure of claim 4 in which said upper and lower shells are formed of stainless steel.

6. A food serving dish comprising a generally rectangular upper metal shell having a substantially horizontal wall portion and an upwardly and outwardly inclined side wall portion extending thereabout, said horizontal wall portion being rectangular in shape and being dimensioned so that the shortest distance from the center of such horizontal portion to the outer limits thereof falls within the range of about 2 to 3 inches, a generally rectangular lower metal shell having a horizontal portion and having an upwardly and outwardly inclined side wall portion, the inclined side wall portions of said upper and lower shells having their peripheral edges hermetically sealed together, said upper and lower shells defining a space therebetween, a heat-retention pellet disposed within said space, said pellet having an enlarged flat portion adapted to engage the undersurface of the horizontal wall of said upper shell, and a resilient heat-insulating cushion within said space between said pellet and said lower shell for urging said pellet upwardly and maintaining the same in contact with the undersurface of said upper shell, the horizontal portions of said upper and lower shells being unsecured to each other.

7. The structure of claim 6 in which said heat-retention pellet is formed of metal and is generally rectangular in shape.

8. The structure of claim 6 in which said pellet is provided with a central aperture, and at least one of the horizontal portions of said upper and lower shells being provided with a central portion projecting into said aperture of said pellet.

9. The structure of claim 8 in which both said upper and lower shells are provided with central portions extending into the aperture of said pellet.

10. The structure of claim 9 in which said aperture of said pellet and said central portions of said upper and lower shells are all generally circular in configuration.

* * * * *